United States Patent
Edamadaka et al.

(10) Patent No.: US 12,519,885 B2
(45) Date of Patent: Jan. 6, 2026

(54) METHOD AND SYSTEM FOR DIRECTORY NUMBER MANAGEMENT

(71) Applicant: JPMorgan Chase Bank, N.A., New York, NY (US)

(72) Inventors: Rajeshwari Edamadaka, Allentown, NJ (US); Praval Saran, Jersey City, NJ (US); Rakesh Kakarla, Plano, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 105 days.

(21) Appl. No.: 18/425,836

(22) Filed: Jan. 29, 2024

(65) Prior Publication Data

US 2025/0247467 A1 Jul. 31, 2025

(51) Int. Cl.
*H04M 3/493* (2006.01)
*H04M 3/523* (2006.01)
*H04Q 3/00* (2006.01)

(52) U.S. Cl.
CPC ......... *H04M 3/4931* (2013.01); *H04M 3/523* (2013.01); *H04Q 3/002* (2013.01); *H04M 2203/558* (2013.01); *H04Q 2213/097* (2013.01)

(58) Field of Classification Search
CPC ............... H04M 3/4931; H04M 3/523; H04M 2203/558; H04Q 3/002; H04Q 2213/097
USPC ..... 379/265.01, 265.02, 242, 265.05, 265.11
See application file for complete search history.

(56) References Cited

U.S. PATENT DOCUMENTS

| | | | | |
|---|---|---|---|---|
| 6,263,061 B1 * | 7/2001 | Tanaka | ................ | H04M 3/4283 379/212.01 |
| 8,577,013 B1 * | 11/2013 | Kennedy | ................... | A61P 3/00 379/212.01 |
| 2006/0023657 A1 * | 2/2006 | Woodson | ................ | H04W 8/18 370/328 |

* cited by examiner

*Primary Examiner* — Thjuan K Addy
(74) *Attorney, Agent, or Firm* — GREENBLUM & BERNSTEIN, P.L.C.

(57) ABSTRACT

A method and a system for dynamic management of allocation of extensions that correspond to directory numbers facilitate a smooth, efficient user experience and operational savings to the allocator. The method includes: receiving, from a user via a user interface such as a telephone terminal, a connect request for an assignment of an extension; analyzing the connect request to determine characteristic traits associated with the user, such as a switch and a physical location; determining a set of available extensions that are assignable to the first user based on the characteristic traits; and assigning, to the user, an extension from within the set of available extensions that has not previously been assigned and that has been prechecked for validity and correct configuration. Upon assignment, the assigned extension is propagated to a ribbon of the user for subsequent usage without needing to reenter the number.

20 Claims, 8 Drawing Sheets

METHOD AND SYSTEM FOR DIRECTORY NUMBER MANAGEMENT

BACKGROUND

1. Field of the Disclosure

This technology generally relates to methods and systems for management of directory numbers used for telecommunication, and more particularly to methods and systems for dynamic management of directory number allocation in a manner that provides a smooth, efficient user experience and operational savings to the allocator.

2. Background Information

All telecommunication requires a use of a telephone number, also known as a Directory Number (DN). The DN is a number that is used to call and reach a destination party. The physical endpoint that terminates this number is a telephone, also referred to herein as a phone. There are a variety of phones ranging from hard land line phones, desk phones, softphones that run as an application or app on a computer, and/or mobile phones. All of these phones typically use a dialable numeric number that is universally reachable, as opposed to using alphanumeric email addresses or Session Initiation Protocol (SIP) addresses.

A unique phone number, also referred to herein as an "extension number" or "Directory Number" or DN, is used to register on a softphone by a specialist. The specialist then logs in to an agent desktop, also referred to herein as a ribbon, by using this extension number and then answers customer calls.

The manual management of DN allocation, the plethora of types of endpoints, the different DNs that a specialist must remember, a cumbersome user experience, an overload on systems, high production tickets, and inefficient and/or low concurrent utilization rates, all demand a better solution.

Contact centers and Private Branch Exchange (PBX) systems require an assignment of a phone number to a contact center specialist. This number is manually handled, and managed by administrators, team leads, business and information technology operations, and these factors make it difficult to manage and maintain ongoing assignments of DNs to users.

In contact centers, there are often high rates attrition, and the DNs must be constantly churned from the departed to the newly joined specialists. This procedure is generally performed manually, making it hard to track, and increasing the likelihood of errors. Errors manifest themselves by reusing a number that is already assigned to someone else, or using a number without proper assignment, or getting locked out because someone else is using the user's number. A specialist can fat finger the DN, also causing errors. This then leads to additional production support incidents, productivity downtime and call queues getting backed up due to insufficient staff to handle the queues.

Extra headcount and/or other types of resources are required for various aspects, including manual administration, capacity tracking, maintenance of spreadsheets, effort for communication to team leads and contact center specialists, and extra capacity to account for downtime. In addition, another challenge is that the number of DNs has grown to unsustainable massive numbers. In one scenario, in addition to an original set of DNs for 50,000 agents having desk phones, another set of 50,000 DNs was needed for softphones when Covid-19 transpired, for the contact center specialists to use when logging in from home. Further, yet another 50,000 DNs was required for Web Real-Time Communications (WebRTC) phones, as the infrastructure mandated a mutually exclusive dial plan for these new technology soft phones, thus resulting in triple the original number of DNs. Data center (DC) migrations and expansions also cause a duplicate, mutually exclusive dial plan of another 150,000 DNs.

The resulting massive number of DNs e.g., 300,000 instead of a much smaller number of DNs that are used concurrently at any given time, has created bloat, high maintenance, and high load on routing and contact center servers. This, in turn, leads to slower start-up operations, performance degradation, difficulty in management and migration of contact center systems from heritage to new data centers, and complex and growing dial plans.

Conventionally, an extension is manually assigned to a specialist, which the specialist must remember and key in manually. The extension is relatively long, e.g., 11 or more digits, and this length sometimes leads to manual input errors. Further, each specialist may be assigned up to three such numbers: one for the in-office hard phone/desk phone, one for the softphone for remote usage (i.e., work from home or from the specialist's computer), and a third DN for the new browser-based softphone. If the specialist is migrated to a new deployment, i.e., in a newer data center with more modern infrastructure, the specialist would then be assigned three new DNs, thus compounding the difficulty for the user. In addition, application packages for the work-from-home softphone typically need to have two versions each for each data center, including a primary version and a secondary version.

Contact center agents often forget to cleanly log off and disconnect from their phones after each shift. Furthermore, their hybrid schedules of switching between the office and working from home have sometimes caused them to need to switch the DNs and use the right one. This leads to a cumbersome user experience and tickets needing production support, additional time and expense in training the personnel.

Yet, at the same time, the format of a DN offers a powerful way to immediately identify and isolate issues. This is because the anatomy of the DN reveals insights about the switch, physical location or building, and the type of WebRTC client, whether used in the office or at home. Conventionally, the assignment has been done manually to keep in mind of all these parameters, and any replacement must meet all the requirements and provide an equivalent solution with all the benefits. A randomly allocated DN will not suffice.

Accordingly, there is a need for a method and a system for dynamic management of directory number allocation in a manner that provides a smooth, efficient user experience and operational savings to the allocator.

SUMMARY

The present disclosure, through one or more of its various aspects, embodiments, and/or specific features or sub-components, provides, inter alia, various systems, servers, devices, methods, media, programs, and platforms for dynamic management of directory number allocation in a manner that provides a smooth, efficient user experience and operational savings to the allocator.

According to an aspect of the present disclosure, a method for dynamic management of directory number allocation in a manner that provides a smooth, efficient user experience and operational savings to the allocator is provided. The method is implemented by at least one processor. The method includes: receiving, by the at least one processor from a first user via a telephone terminal, a connect request for an assignment of an extension that corresponds to a directory number that has a predetermined number of digits; analyzing, by the at least one processor, the connect request to determine at least one characteristic trait associated with the first user; determining, by the at least one processor, a set of available extensions that are assignable to the first user based on the at least one characteristic trait; and assigning, by the at least one processor to the first user, a first extension from within the set of available extensions that has not previously been assigned.

The at least one characteristic trait may include at least one from among a switch associated with the first user, a data center associated with the first user, a deployment associated with the first user, and a physical location associated with the first user.

The set of available extensions may include a predetermined range of numbers having a minimum, a maximum, and every integer between the minimum and the maximum.

The method may further include prechecking to determine whether the first extension is valid and correctly configured before the assigning of the first extension to the first user.

Each extension may include a twelve-digit number within which a first subset of digits refers to a switch identifier that is associated with one from among a predetermined plurality of switches, a second subset of digits refers to a site code that is associated with a physical location, and a third subset of digits uniquely refers to the first user.

The method may further include: before the receiving of the connect request from the first user, allocating, to each switch included in the predetermined plurality of switches, a respective set of switch-specific extensions, such that a number of switch-specific extensions allocated to each switch included in the predetermined plurality of switches is equal.

The method may further include: after the assigning of the first extension to the first user, transmitting, to the first user, a message that notifies the first user of the assigned extension, the message including a prompt to click on a button to establish a connection between the first user and the first extension; receiving, from the first user, an indication that the first user has clicked on the button; and propagating the assigned extension to a ribbon associated with the first user in order to facilitate subsequent uses of the first extension by the first user without requiring reentry of the first extension by the first user.

Each extension included in the set of available extensions may be associated with a Web Real-Time Communication (WebRTC) softphone application.

The assigning of the first extension may occur within 100 milliseconds of the receiving of the connect request.

According to another exemplary embodiment, a computing apparatus for managing an allocation of extensions that correspond to directory numbers is provided. The computing apparatus includes a processor; a memory; and a communication interface coupled to each of the processor and the memory. The processor is configured to: receive, from a first user via a telephone terminal and the communication interface, a connect request for an assignment of an extension that corresponds to a directory number that has a predetermined number of digits; analyze the connect request to determine at least one characteristic trait associated with the first user; determine a set of available extensions that are assignable to the first user based on the at least one characteristic trait; and assign, to the first user, a first extension from within the set of available extensions that has not previously been assigned.

The at least one characteristic trait may include at least one from among a switch associated with the first user, a data center associated with the first user, a deployment associated with the first user, and a physical location associated with the first user.

The set of available extensions may include a predetermined range of numbers having a minimum, a maximum, and every integer between the minimum and the maximum.

The processor may be further configured to precheck to determine whether the first extension is valid and correctly configured before the assignment of the first extension to the first user.

Each extension may include a twelve-digit number within which a first subset of digits refers to a switch identifier that is associated with one from among a predetermined plurality of switches, a second subset of digits refers to a site code that is associated with a physical location, and a third subset of digits uniquely refers to the first user.

The processor may be further configured to: before the connect request is received from the first user, allocate, to each switch included in the predetermined plurality of switches, a respective set of switch-specific extensions, such that a number of switch-specific extensions allocated to each switch included in the predetermined plurality of switches is equal.

The processor may be further configured to: after the assignment of the first extension to the first user, transmit, to the first user via the communication interface, a message that notifies the first user of the assigned extension, the message including a prompt to click on a button to establish a connection between the first user and the first extension; receive, from the first user via the communication interface, an indication that the first user has clicked on the button; and propagate the assigned extension to a ribbon associated with the first user in order to facilitate subsequent uses of the first extension by the first user without requiring reentry of the first extension by the first user.

Each extension included in the set of available extensions may be associated with a Web Real-Time Communication (WebRTC) softphone application.

The assignment of the first extension may occur within 100 milliseconds of the reception of the connect request.

According to yet another exemplary embodiment, a non-transitory computer readable storage medium storing instructions for managing an allocation of extensions that correspond to directory numbers is provided. The storage medium includes executable code which, when executed by a processor, causes the processor to: receive, from a first user via a telephone terminal, a connect request for an assignment of an extension that corresponds to a directory number that has a predetermined number of digits; analyze the connect request to determine at least one characteristic trait associated with the first user; determine a set of available extensions that are assignable to the first user based on the at least one characteristic trait; and assign, to the first user, a first extension from within the set of available extensions that has not previously been assigned.

The at least one characteristic trait may include at least one from among a switch associated with the first user, a data center associated with the first user, a deployment associated with the first user, and a physical location associated with the first user.

BRIEF DESCRIPTION OF THE DRAWINGS

The present disclosure is further described in the detailed description which follows, in reference to the noted plurality

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
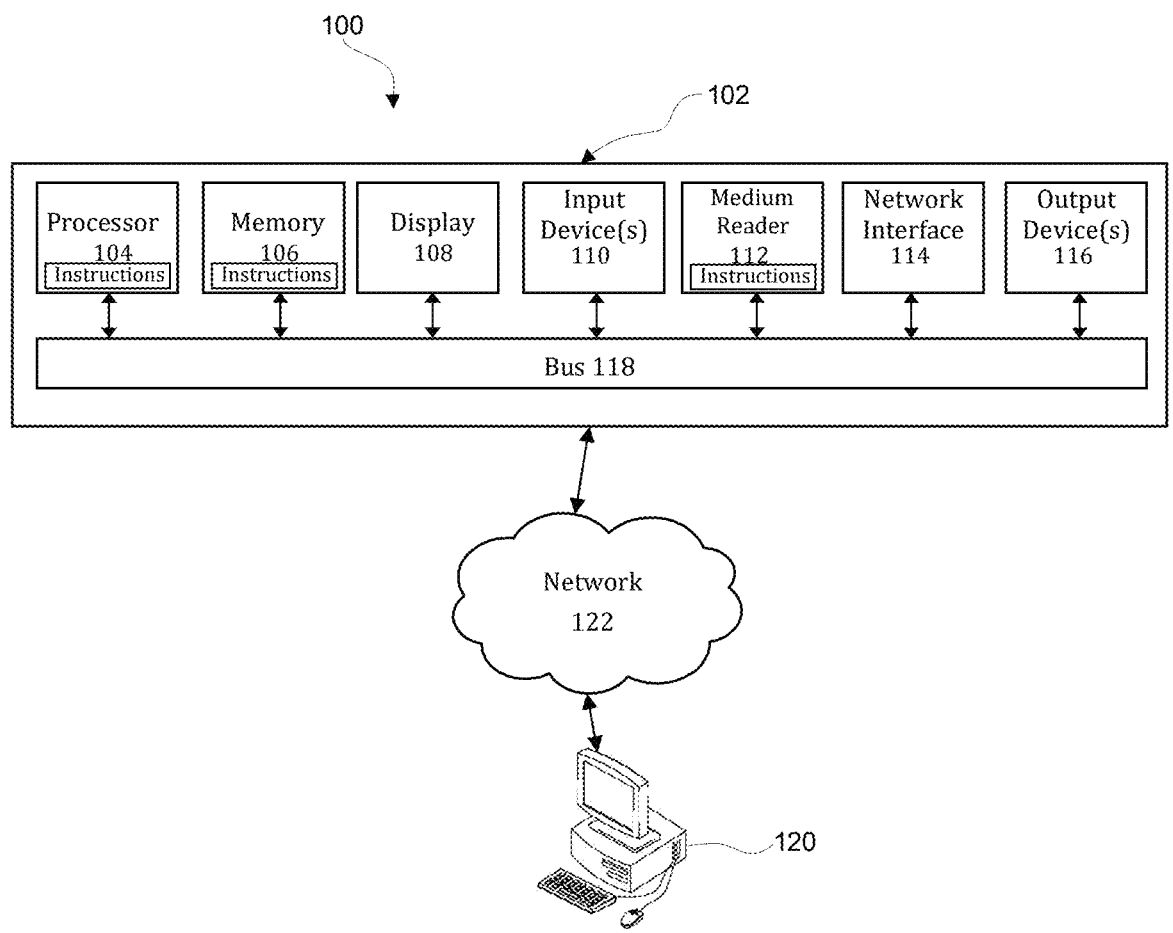
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, a device that is running the Apple iOS operating system, a device that is running the Android operating system, a device that is capable of running a web browser to connect to the Internet, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, a device that is running the Apple iOS operating system, a device that is running the Android operating system, a device that is capable of running a web browser to connect to the Internet, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for dynamic management of directory number allocation in a manner that provides a smooth, efficient user experience and operational savings to the allocator.

Figure 2:
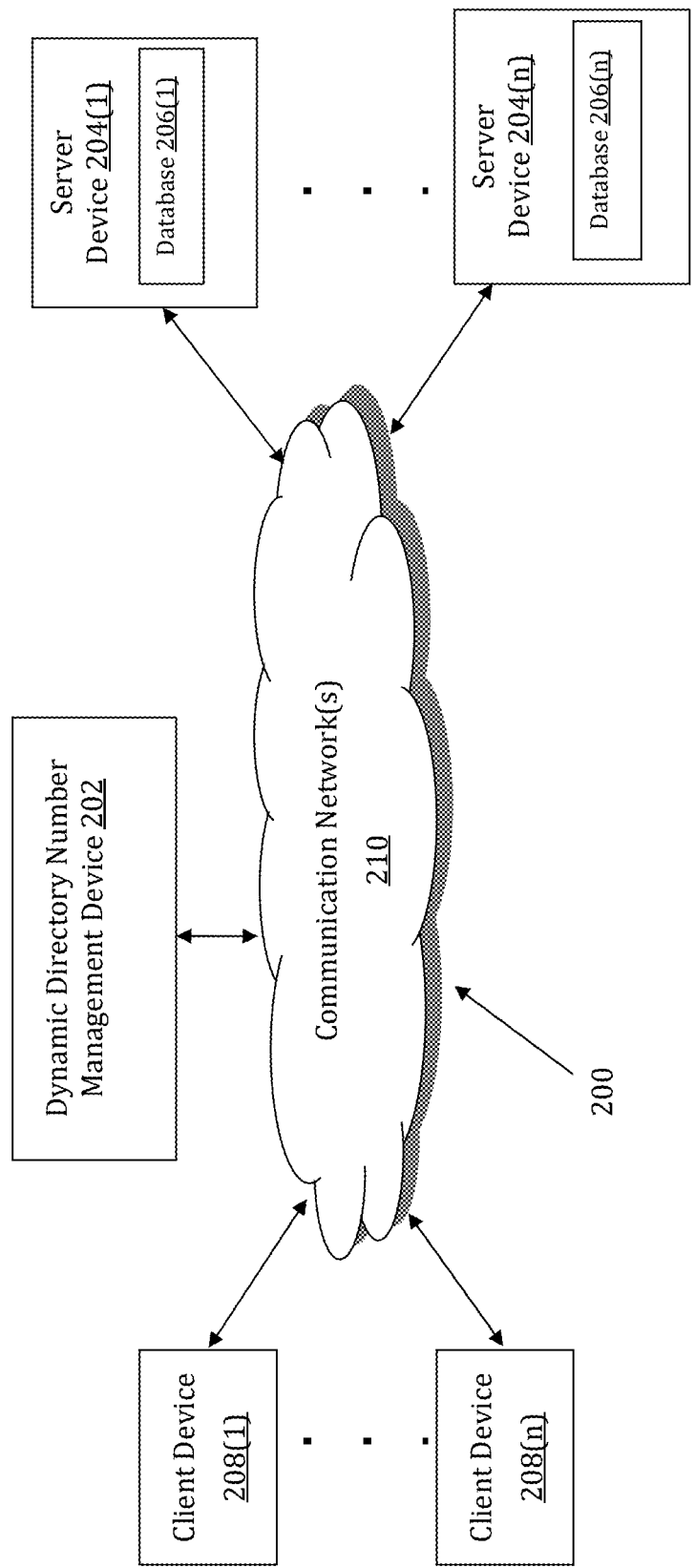
FIG. 2 illustrates an exemplary diagram of a network environment.

Referring to FIG. 2, a schematic of an exemplary network environment 200 for implementing a method for dynamic management of directory number allocation in a manner that provides a smooth, efficient user experience and operational savings to the allocator is illustrated. In an exemplary embodiment, the method is executable on any networked computer platform, such as, for example, a personal computer (PC), a device that is running the Apple iOS operating system, a device that is running the Android operating system, or a device that is capable of running a web browser to connect to the Internet.

The method for dynamic management of directory number allocation in a manner that provides a smooth, efficient user experience and operational savings to the allocator may be implemented by a Dynamic Directory Number Management (DDNM) device 202. The DDNM device 202 may be the same or similar to the computer system 102 as described with respect to FIG. 1. The DDNM device 202 may store one or more applications that can include executable instructions that, when executed by the DDNM device 202, cause the DDNM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DDNM device 202 itself, may be located in virtual server(s) running in a cloud-based computing environment rather than being tied to one or more specific physical network computing devices. Also, the application(s) may be running in one or more virtual machines (VMs) executing on the DDNM device 202. Additionally, in one or more embodiments of this technology, virtual machine(s) running on the DDNM device 202 may be managed or supervised by a hypervisor.

In the network environment 200 of FIG. 2, the DDNM device 202 is coupled to a plurality of server devices 204(1)-204(n) that hosts a plurality of databases 206(1)-206(n), and also to a plurality of client devices 208(1)-208(n) via communication network(s) 210. A communication interface of the DDNM device 202, such as the network interface 114 of the computer system 102 of FIG. 1, operatively couples and communicates between the DDNM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DDNM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DDNM devices that efficiently implement methods and systems for dynamic management of directory number allocation in a manner that provides a smooth, efficient user experience and operational savings to the allocator.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DDNM device 202 may be a standalone device or integrated with one or more other devices or apparatuses, such as one or more of the server devices 204(1)-204(n), for example. In one particular example, the DDNM device 202 may include or be hosted by one of the server devices 204(1)-204(n), and other arrangements are also possible. Moreover, one or more of the devices of the DDNM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DDNM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in an availability zone, which may include internal or external networks. The server devices 204(1)-204(n) hosts the databases 206(1)-206(n) that are configured to store data that relates to directory number indices and data that relates to directory number service status and availability. In an exemplary embodiment, the databases 206(1)-206(n) are distributed across datacenters, while maintaining high levels of consistency and performance.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DDNM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DDNM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DDNM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DDNM device 202, the server devices 204(1)-204(n), or the client devices 208(1)-208(n), for example, may be configured to operate as virtual instances on the same physical machine. In other words, one or more of the DDNM device 202, the server devices 204(1)-204(n), or the client devices 208(1)-208(n) may operate on the same physical device rather than as separate devices communicating through communication network(s) 210. Additionally, there may be more or fewer DDNM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
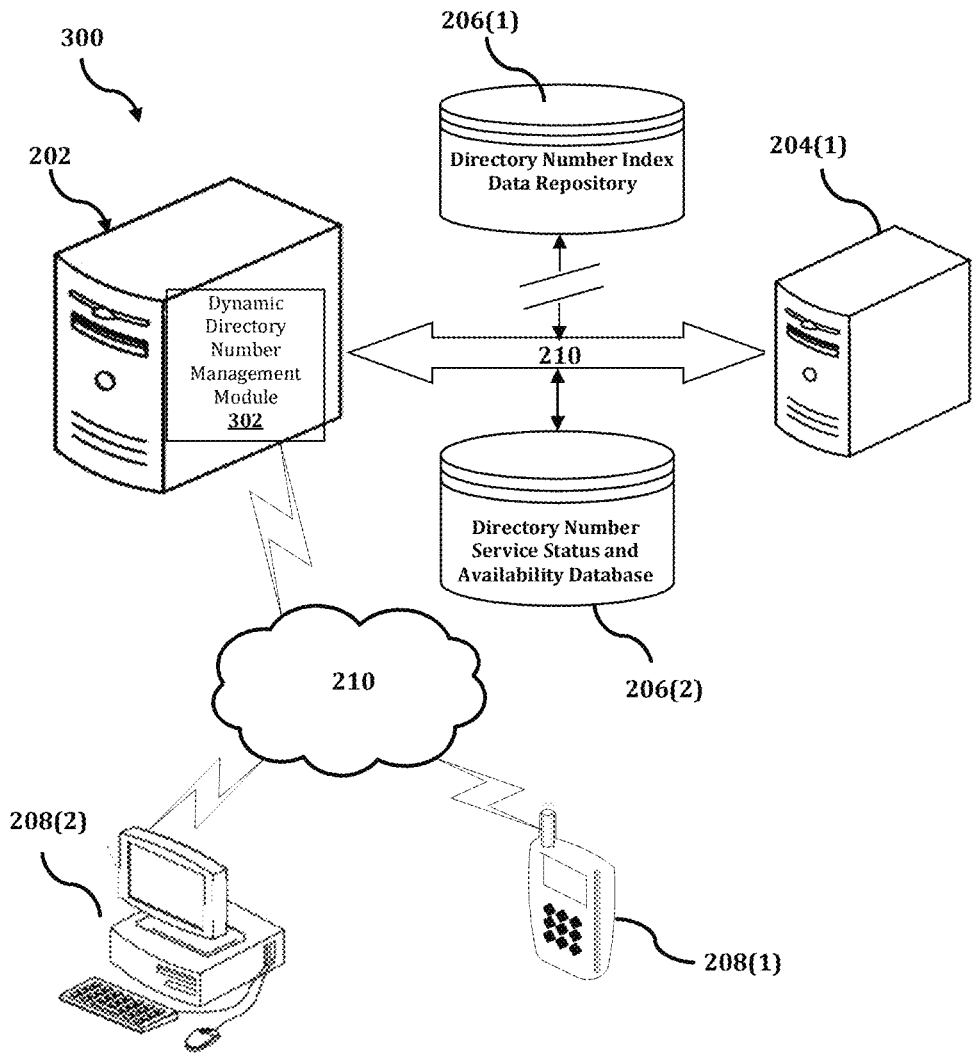
FIG. 3 shows an exemplary system for implementing a method for dynamic management of directory number allocation in a manner that provides a smooth, efficient user experience and operational savings to the allocator.

The DDNM device 202 is described and illustrated in FIG. 3 as including a dynamic directory number management module 302, although it may include other rules, policies, modules, databases, or applications, for example. As will be described below, the dynamic directory number management module 302 is configured to implement a method for dynamic management of directory number allocation in a manner that provides a smooth, efficient user experience and operational savings to the allocator.

An exemplary process 300 for implementing a mechanism for dynamic management of directory number allocation in a manner that provides a smooth, efficient user experience and operational savings to the allocator by utilizing the network environment of FIG. 2 is illustrated as being executed in FIG. 3. Specifically, a first client device 208(1) and a second client device 208(2) are illustrated as being in communication with DDNM device 202. In this regard, the first client device 208(1) and the second client device 208(2) may be "clients" of the DDNM device 202 and are described herein as such. Nevertheless, it is to be known and understood that the first client device 208(1) and/or the second client device 208(2) need not necessarily be "clients" of the DDNM device 202, or any entity described in association therewith herein.

Any additional or alternative relationship may exist between either or both of the first client device 208(1) and the second client device 208(2) and the DDNM device 202, or no relationship may exist. For example, the DDNM device 202 and the first client device 208(1) may be configured as the same physical device.

Further, DDNM device 202 is illustrated as being able to access a directory number index data repository 206(1) and a directory number service status and availability database 206(2). The dynamic directory number management module 302 may be configured to access these databases for implementing a method for dynamic management of directory number allocation in a manner that provides a smooth, efficient user experience and operational savings to the allocator.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DDNM device 202 via broadband or cellular communication. Alternatively, the process may be executed by the DDNM device 202 in a standalone manner, e.g., by a smart phone on which the interaction services routing and handling module 302 has been downloaded. Of course, these embodiments are merely exemplary and are not limiting or exhaustive.

Upon being started, a processor that is hosted in the DDNM device 202 executes a dynamic management of directory number allocation in a manner that provides a smooth, efficient user experience and operational savings to the allocator. An exemplary process for dynamic management of directory number allocation in a manner that provides a smooth, efficient user experience and operational savings to the allocator is generally indicated at flowchart 400 in FIG. 4.

Figure 4:
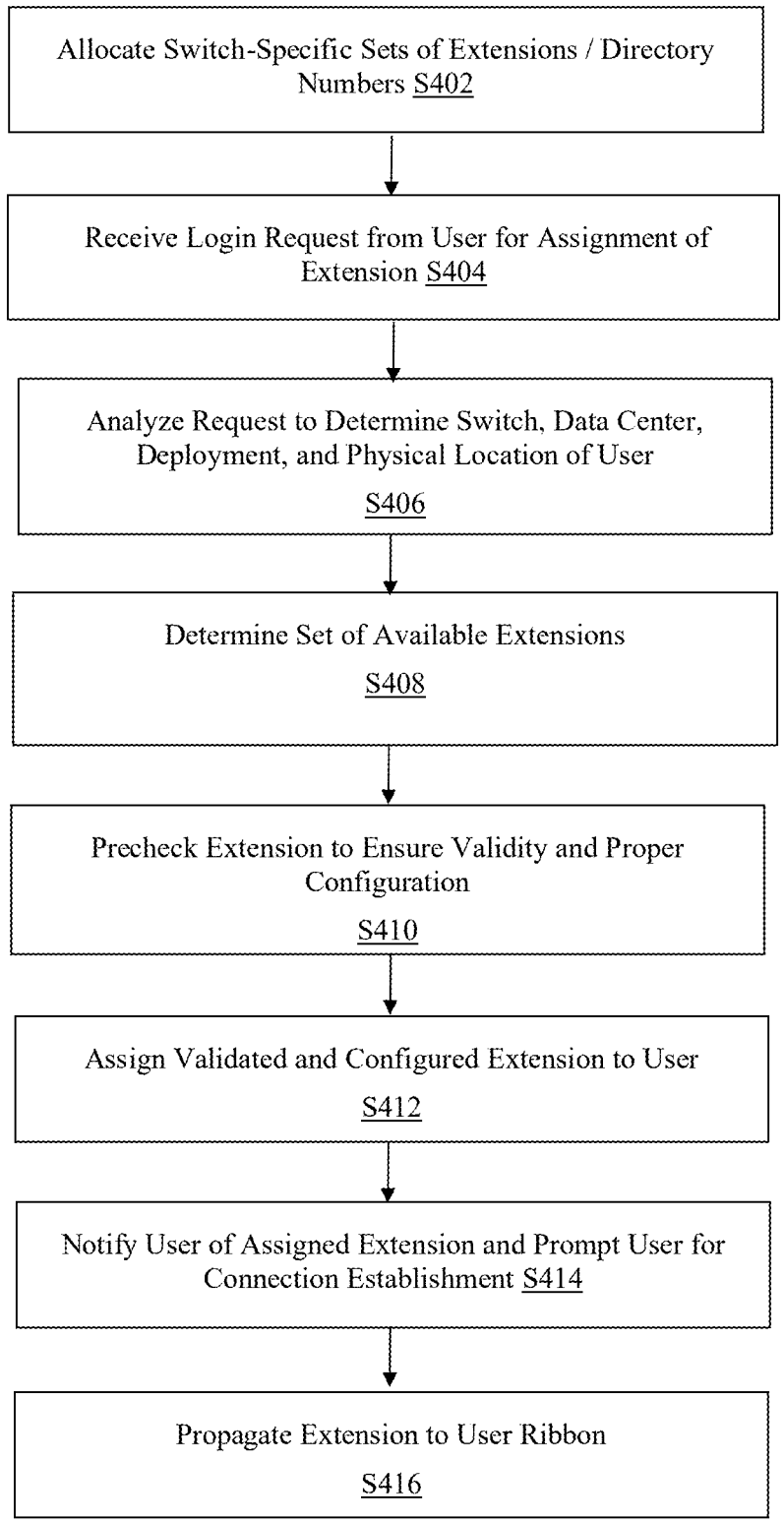
FIG. 4 is a flowchart of an exemplary process for implementing a method for dynamic management of directory number allocation in a manner that provides a smooth, efficient user experience and operational savings to the allocator.

In process 400 of FIG. 4, at step S402, the dynamic directory number management module 302 allocates sets of switch-specific DNs to each respective one of a predetermined plurality of switches. In this context, an extension corresponds to a directory number, and as such, the terms "extension", "directory number", and "DN used interchangeably. Further, a switch corresponds to an agent Session Initiation Protocol (SIP) server, and in an exemplary embodiment, for any particular deployment, there may be two data centers in each deployment, and there may be six switches in each data center. In an exemplary embodiment, the validity of each extension is checked, and if there is an error, the dynamic directory management module 302 proceeds to the next valid extension. In this aspect, the dynamic directory management module 302 is proactive in attempting to return valid extensions, including rotating through queued extensions, checking orphaned extensions, and triggering reclaiming as required.

In an exemplary embodiment, each extension has a predetermined number of digits, such as, for example, 10 digits, and the extension has a predetermined format by which certain digits correspond to certain fields of data. For example, after the first 3 digits which represent a prefix, the fourth and fifth digits may correspond to a switch identifier, and for one particular deployment that has a total of two data centers and 10 switches, the switch identifier may be equal to an integer between 60 and 65 inclusive or an integer between 70 and 75 inclusive. Another field may refer to a site code that corresponds to a physical location, and yet another field may uniquely refer to an individual user. Alternatively, each extension may also include a prefix having a predetermined number of additional digits, such as, for example, a three-digit prefix, thereby resulting in each extension having 12 digits. In an exemplary embodiment, the allocation of switch-specific extensions is performed in a manner so as to ensure that each switch has an equal number of allocated extensions. For example, this may be accomplished by frequently monitoring the size of the queue for each site code; acquiring lock at a site code when the size of the queue is less than a predefined load factor, such as, for example, 50% of the maximum queue size; and retrieving from various switch servers to ensure an even load balance across switches.

At step S404, the dynamic directory number management module 302 receives a connect request for an assignment of an extension. The connect request is received from a user via a telephone terminal of the user. In an exemplary embodiment, the telephone terminal resides on a computer terminal, and the requested extension is to be used in association with a Web Real-Time Communication (WebRTC) softphone application.

At step S406, the dynamic directory number management module 302 analyzes the connect request to determine one or more characteristic traits of the user. In an exemplary embodiment, the characteristic traits may include any one or more of a switch associated with the user, a data center associated with the user, a deployment associated with the user, and a physical location associated with the user.

At step S408, the dynamic directory number management module 302 determines a set of available extensions that are assignable to the user based on the characteristic traits determined in step S406. For example, the set of available extensions may include the switch-specific set of extensions allocated to the particular switch with which the user is associated. In an exemplary embodiment, the set of available extensions may include a predetermined range of numbers having a minimum, a maximum, and every integer between the minimum and the maximum. In an exemplary embodiment, the minimum and maximum ranges for a particular site code can be changed dynamically in a manner that allows the system to adjust accordingly, in order to accommodate changes in staff size at various sites.

At step S410, the dynamic directory number management module 302 prechecks a candidate extension that is potentially to be assigned to the user to ensure that the candidate extension is a valid extension and that it is correctly configured. Then, assuming that the candidate extension is valid and properly configured, at step S412, the dynamic directory number management module 302 assigns the extension to the user.

In an exemplary embodiment, the dynamic directory number management module 302 is capable of operating at a relatively large scale of users, i.e., approximately 250,000 users, and in a scalable manner, and able to withstand bursts of requests that may be expected to be received at an approximate rate of 6000 requests per second. The dynamic directory number management module 302 is also expected to have a high availability rate of at least 99.99%, and in an exemplary embodiment, the total amount of time from the receipt of a connect request at step S402 to the assignment of an extension at step S412 requires less than 100 milliseconds. In another exemplary embodiment, the total amount of time from the receipt of a connect request at step S402 to the assignment of an extension at step S412 requires less than 45 milliseconds.

At step S414, the dynamic directory number management module 302 transmits a message to the user in order to notify the user of the assignment of the extension and to prompt the user to click on a button in order to establish a connection between the user and the assigned extension. When the user clicks on the button, the dynamic directory number management module 302 receives an indication that this button click has occurred, and then, at step S416, the dynamic directory number management module 302 propagates the newly assigned extension to a ribbon that is associated with the user in order to facilitate subsequent uses of the assigned extension without requiring reentry of the assigned extension by the user.

In an exemplary embodiment, Web Real Time Communication (WebRTC) is a browser-based technology that facilitates the creation of softphones as a web application, with the browser providing high fidelity coder/decoders for pristine audio quality, and the term "Omni WebRTC" refers to a softphone application. Since this is an endpoint that is authored by developers, it is relatively straightforward to control the DN that it uses. Alternatively, other endpoints can also be triggered to use a particular DN.

WebRTC has two modes: one for working from home, using a browser, and another to replace in-office desk phones; the second requires virtual desktop interface (VDI) technology.

In an exemplary embodiment, an objective is to swap out all former types of endpoints with an Omni WebRTC solution which uses dynamic extension management for a smooth, efficient user experience and significant operational savings. The present disclosure describes an exemplar of a complex resource assignment solution, where a resource is a numeric identifier that is constituted by a series of requirements. Further, the solution encompasses the full lifecycle of the resource in a real time, low latency, mission critical, massive scale domain with zero administrative overhead, automatic discovery and allocation, and self-healing.

WebRTC is a softphone application. A unique phone number (hereinafter referred to as "extension number" or "Directory Number" or DN) is used to register on the softphone. A user may then log in to an agent desktop using this extension number and service customer calls.

In an exemplary embodiment, an extension number is a 12-digit number and has a predetermined format, based on the following example: For AAA-XX-YYY-ZZZZ, AAA represents the prefix, XX represents a switch identifier, also referred to herein as an agent SIP server; YYY represents a site code; and ZZZZ can be any four-digit number between 0000 to 9999 that is configured on the agent SIP server.

In an exemplary embodiment, there are ten (ten) agent SIP servers and possible values are 60, 61, 62, 63, 64, 70, 71, 72, 73 and 74. The site code is used to identify the region or location where the softphone is located. Country-specific and region-specific site codes may be used by specialists working from home. In addition, many site codes are based on building location identifiers that correspond to physical locations across the world. In an exemplary embodiment, based on usage patterns, the extensions are created across 250 site codes and equally distributed across all 10 SIP servers. In another exemplary embodiment, there is another deployment of 10 SIP servers for which possible values are 80, 81,82, 83, 84, 90, 91, 92, 93, and 94.

In an exemplary embodiment, an automated solution using cloud native microservices is being implemented to satisfy the requirements described above and the following aspects to further make the specialist experience seamless, and to abstract away the underlying extreme complexity. A microservice referred to as Endpoint Registry Microservice has been built to manage the dynamic extensions.

In an exemplary embodiment, an extension is dynamically and/or programmatically assigned to a user when he/she logs onto the WebRTC softphone application, and upon receiving the assignment, the user simply clicks to establish a connection. Once the dynamically assigned extension appears automatically on the WebRTC user interface (UI), the user can simply hit "Connect" to use this extension on their WebRTC softphone. This DN is automatically propagated to the user's ribbon, so the user does not need to reenter the dynamically assigned DN. This extension is allocated to the user exclusively until the user disconnects. Even then, in an exemplary embodiment, there is a grace period of two hours where the DN will not be assigned to anyone else. In this aspect, the user experience is a single click experience and has been greatly simplified.

In an exemplary embodiment, telemetry and discovery are provided vai the use of dashboards that show who has what DN, how many have been allocated, how many are still in reserve, and other relevant information. This helps information technology (IT) operations personnel to monitor the self-managing solution workday in and out and survive various error scenarios, data center failure, availability zone failure, other types of infrastructure failure, and resiliency scenarios.

In an exemplary embodiment, the allocation of DNs has specific requirements, including the following: 1) Each agent SIP server, or switch, has a unique range of extensions (e.g., 555617888000-555617889999), mutually exclusive from another switch, and has the switch identifier embedded in the DN as the fourth and fifth digits of the 12-digit number (e.g., 11). 2) Extensions should always be allocated in an equal fashion at all times, i.e., distributed equally and load balanced across all of the switches, across data centers, and across deployments. 3) There are five switches per data center and either one or two such data centers in a single deployment. 4) There can be two or more parallel deployments. 5) Should allow for migration of a specialist from one deployment to another deployment. 6) Once migration is complete for the given specialist, or for a set of specialists identified by a common parameter such as a workgroup, the previous DNs are no longer valid and are not available for future assignment.

In an exemplary embodiment, the allocation of an individual DN satisfies the following requirements: 1) A DN is allocated by first detecting which deployment a specialist is active in, and then selecting a DN from the dial plan range applicable to that deployment. 2) Then, a selection of the next switch from which to allocate the DN is made, so that all switches have equal numbers of DNs allocated at any time. 3) The site code is selected based on specialist's location. 4) Then, a sub range is determined based on the applicable type of WebRTC client, i.e., either an in-office VDI WebRTC client or a remote work-from-home WebRTC client. 5) The allocation prechecks whether the DN is valid and configured. 6) The allocation checks whether the infrastructure for that DN is available and healthy, i.e., by checking the corresponding switch and the SIP proxy. 7) DNs may be added back into the pool if they are not in use for more than a predefined time. 8) DNs that are invalid, failed, or reserved, but not actively connected, may be re-harvested if reserves are perilously low, compared to the demand.

In an exemplary embodiment, the algorithm and pool of DNs account for each of the following: 1) Any buffer needed for error conditions with any switch and/or for a data center being down. 2) Retry of any unavailable DNs periodically to check whether infrastructure is back up, and addition thereof back to the pool from which it is allocated. 3) The implementation is workable for a relatively high scale, i.e., on the order of 250K users, in a scalable manner, with relatively low latency on the order of less than 100 milliseconds, and also able to withstand bursts of requests, i.e., on the order of 6000 requests per second, and is also able highly available, i.e., an availability that is approximately equivalent to 99.9999% of the time. 4) The following scenarios are accommodated re resiliency and scalability: A) if and when instances crash; B) if and when many DNs become invalid; C) client side resiliency for retrying and obtaining another DN when specific invalidity/configuration errors are encountered; D) change in dynamic DN range for a particular site code; and E) accommodation of new site codes.

In an exemplary embodiment, site codes have further complexity in terms of the following requirements: 1) The algorithm considers the user's physical location and chooses the nearest infrastructure data center, while also identifying locations for emergency services. 2) Each site code is correlated to a physical building identification and/or address, in a geographical country and/or a geographical region. 3) If there is no match, the algorithm provides a default site code based on geographical region. 4) The number of DNs at each building is considered, as this number may vary widely, i.e., between numbers that are less than ten and numbers in the thousands. 5) DNs are distributed across all 48 instances of microservices equally so that load balanced requests to allocate a DN are equally spread out. In an exemplary embodiment, these requirements result in having a dynamic DN custom range per site code, while also enabling a stateless algorithm that makes DNs available across any instance. For example, in some instances, a site range is less than the corresponding number of microservices, or a particular microservice may run out and thus require rerouting through another hop to another instance, subject to a maximum of two hops before returning.

Figure 5:
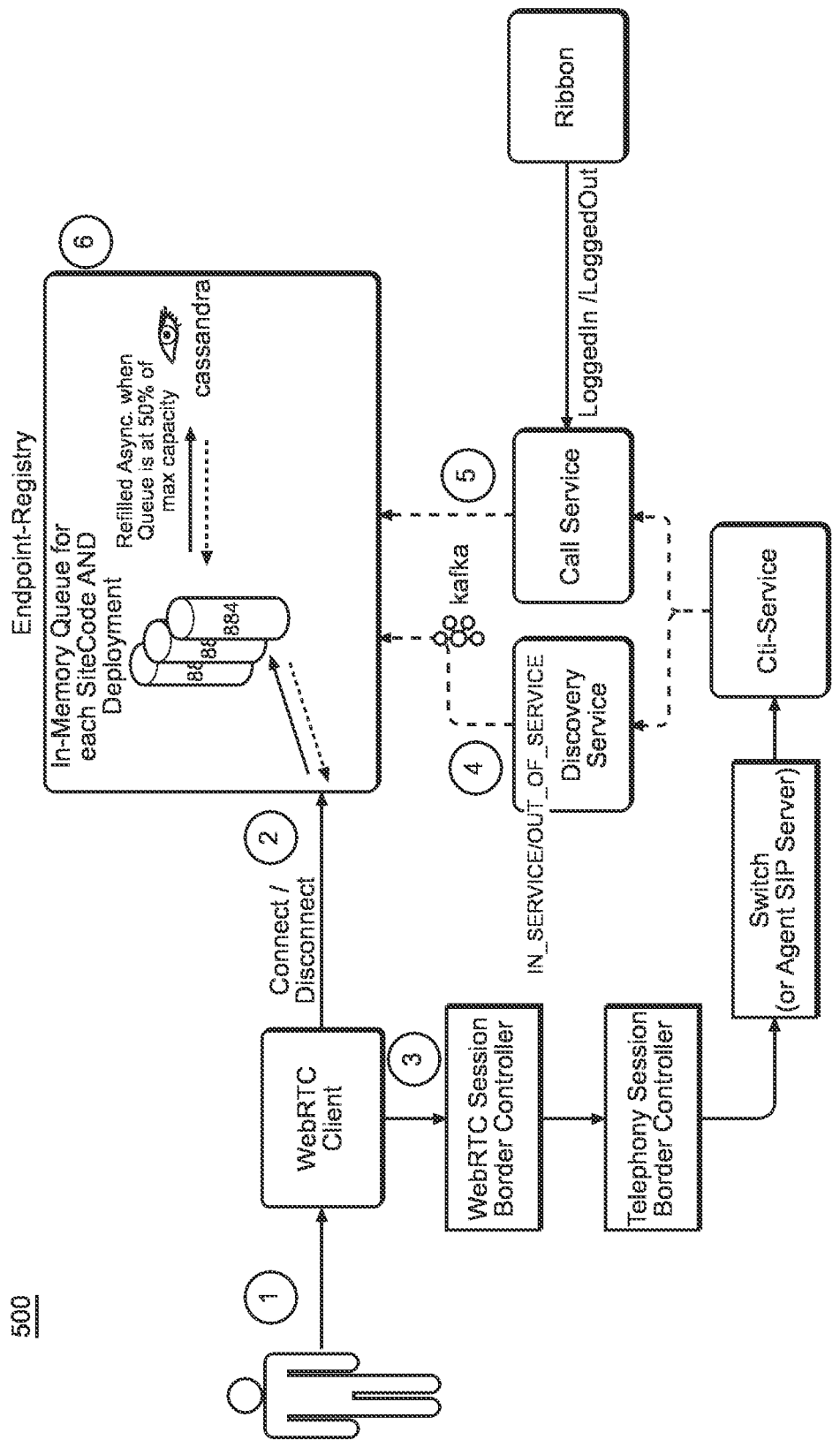
FIG. 5 is a flow diagram that illustrates an operation of a system for dynamic management of directory number allocation in a manner that provides a smooth, efficient user experience and operational savings to the allocator, according to an exemplary embodiment.

FIG. 5 is a flow diagram 500 that illustrates an operation of a system for dynamic management of directory number allocation in a manner that provides a smooth, efficient user experience and operational savings to the allocator, according to an exemplary embodiment.

In an exemplary embodiment, as illustrated in flow diagram 500, an endpoint registry service maintains the service status i.e., either "IN_SERVICE" or "OUT_OF_SERVICE", of each DN by consuming Kafka events. The application maintains the agent Logged In/Logged Out state of each DN by consuming Kafka events. The application also maintains the state of each DN from the WebRTC client's perspective. Such states include "CONNECTED", "DISCONNECTED", "FAILED", and other possible states. A pool of extensions is maintained in-memory for every site code. Each pool has a maximum size. When a pool falls below 50% of its maximum size, the pool is then refilled. The application ensures that the DNs are evenly distributed across the various SIP servers. Extensions are recycled when they are not in use for more than four (4) hours.

Figure 6:
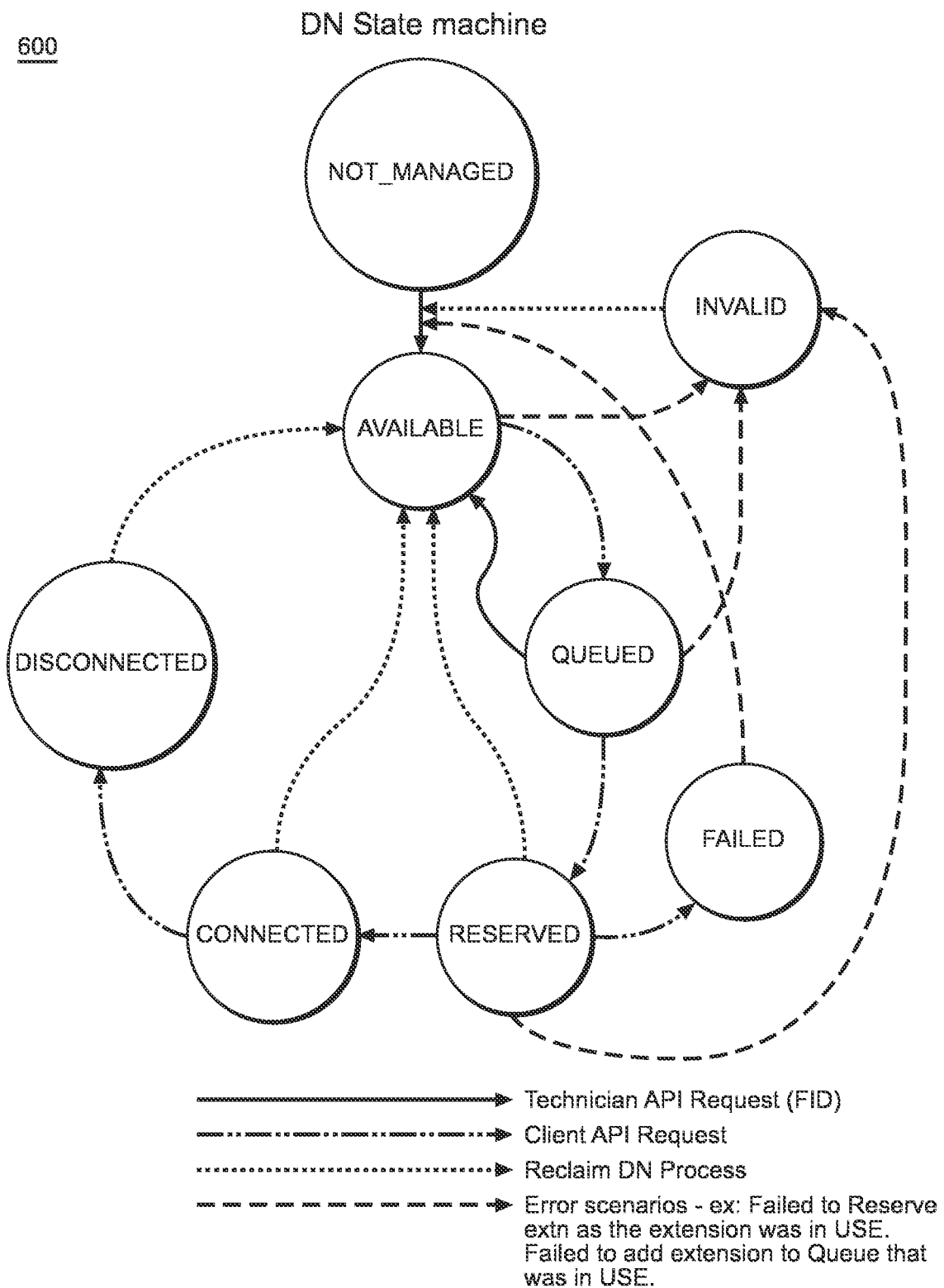
FIG. 6 is a state machine diagram that illustrates various states in an operation of a system for dynamic management of directory number allocation in a manner that provides a smooth, efficient user experience and operational savings to the allocator, according to an exemplary embodiment.

FIG. 6 is a state machine diagram 600 that illustrates various states in an operation of a system for dynamic management of directory number allocation in a manner that provides a smooth, efficient user experience and operational savings to the allocator, according to an exemplary embodiment.

As illustrated in state machine diagram 600, the "NOT_MANAGED" state refers to the first possible state of a DN being set to "NOT_AVAILABLE", which means that the DN is not eligible to be part of the dynamic pool of extensions. The "AVAILABLE" state refers to extensions that are eligible to be part of the dynamic pool of extensions. In an exemplary embodiment, this may be done with the help of an application programming interface (API) as a one-time activity. Also, when a DN is unreserved, it is set to the AVAILABLE state.

As also illustrated in state machine diagram 600, the "QUEUED" state refers to a circumstance by which each instance of the endpoint registry reads the DNs that are in the "AVAILABLE" state and then updates the state to "QUEUED" before loading the updated extensions in its queue, i.e., in memory. The "RESERVED" state refers to a circumstance by which the state of the DN is updated to "RESERVED" when a DN is polled from the queue, i.e., when a user clicks on a "Connect" button on the WebRTC client.

As also illustrated in state machine diagram 600, the "CONNECTED" state refers to a circumstance by which the state is updated to "CONNECTED" when the subscription and/or registration is successful. The "DISCONNECTED" state refers to a circumstance by which the state is updated to "DISCONNECTED" when the subscription is deleted, i.e., when a user clicks on a "Disconnect" button on the WebRTC client.

As also illustrated in state machine diagram 600, the "FAILED" state refers to a circumstance by which the state is updated to "FAILED" when the subscription fails. This might happen if the DN is not properly configured, or in case there is a major infrastructure issue, such as both data centers being down. The "INVALID" state refers to a circumstance by which the state is updated to "INVALID" in scenarios where the DN cannot be assigned to either of the QUEUED state or the RESERVED state due to the DN Service Status being IN_SERVICE.

Figure 7:
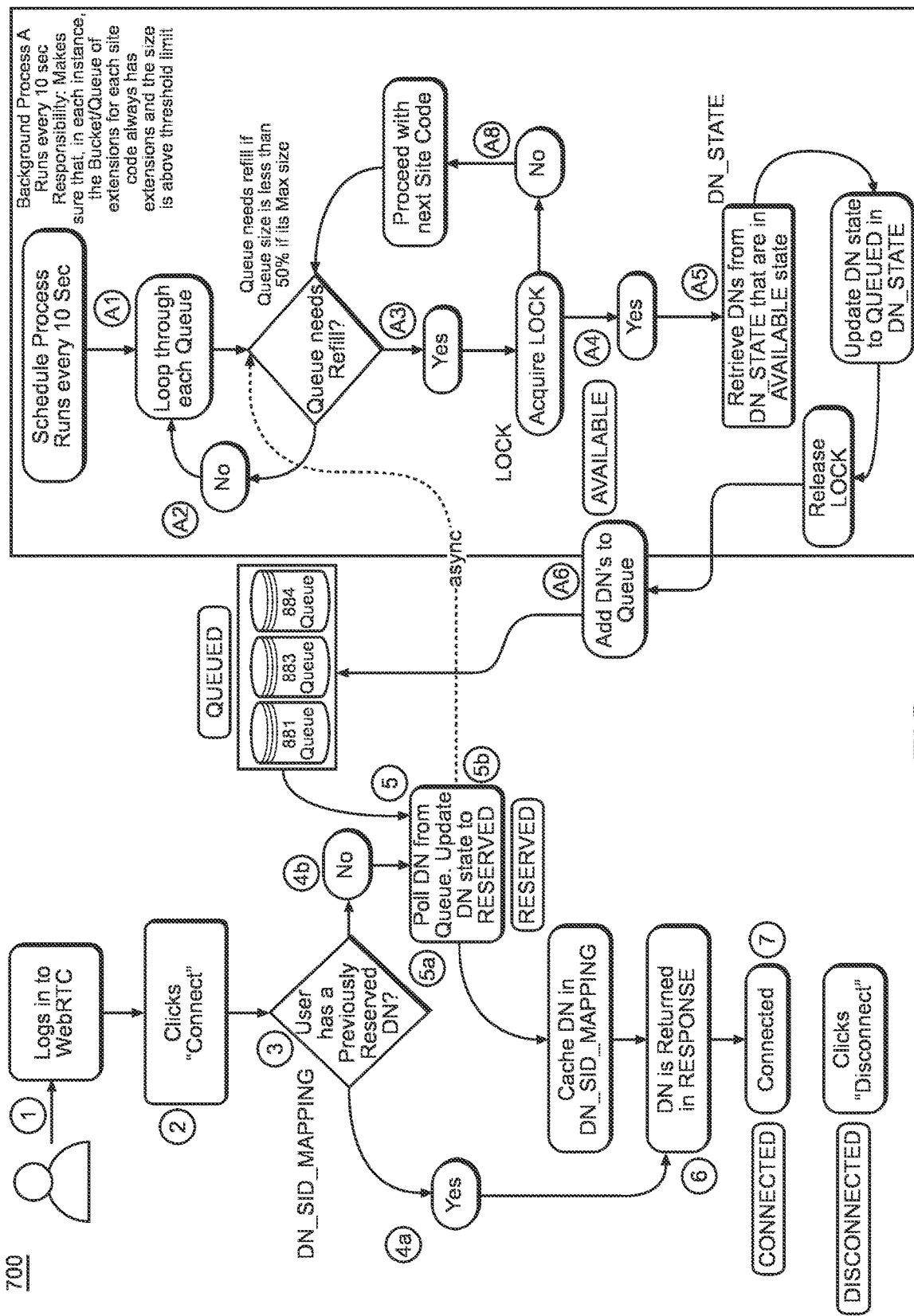
FIG. 7 is a flow diagram that illustrates an extension reservation process in an operation of a system for dynamic management of directory number allocation in a manner that provides a smooth, efficient user experience and operational savings to the allocator, according to an exemplary embodiment.

FIG. 7 is a flow diagram 700 that illustrates an extension reservation process in an operation of a system for dynamic management of directory number allocation in a manner that provides a smooth, efficient user experience and operational savings to the allocator, according to an exemplary embodiment.

As illustrated in flow diagram 700, an extension reservation process includes a first process that is executed interactively with a user, as illustrated on the left side of diagram 700, and a background process that runs periodically, e.g., every 10 seconds, as illustrated on the right side of diagram 700. Regarding the interactive user-guided process: In a first step, the user logs in to the WebRTC application, and in a second step, the user clicks a "Connect" button. In a third step, a determination is made as to whether the user has a previously reserved DN, and if not (i.e., step 4b), in a fifth step, a DN is polled from a queue, and its state is updated to Reserved, and the DN is then cached. If a determination is made that the user does have a previously reserved DN, then the process skips to a sixth step in which the DN is returned to the user in a response. Then, in a seventh step, the user is connected to the DN, and this continues until the user clicks a Disconnect button to become disconnected.

In the background process, in a first step, a loop through each queue is conducted by checking whether the queue needs a refill, and if not, in a second step, the process returns to the first step. If the queue does need a refill, then in third step, a lock state is acquired, the lock state is confirmed in a fourth step, and then in a fifth step, a retrieval of DNs that are in the AVAILABLE state is performed, and the state is then updated to QUEUED and the lock is released. In a sixth state, the DNs are added to the queue, such that there are available for polling in the fifth step of the interactive user process. Finally, when the lock state is not successfully acquired in the fourth step, the background process skips to an eighth step in which the process proceeds with a next site code, and then returns to the third step for a new determination as to whether the queue needs a refill.

Figure 8:
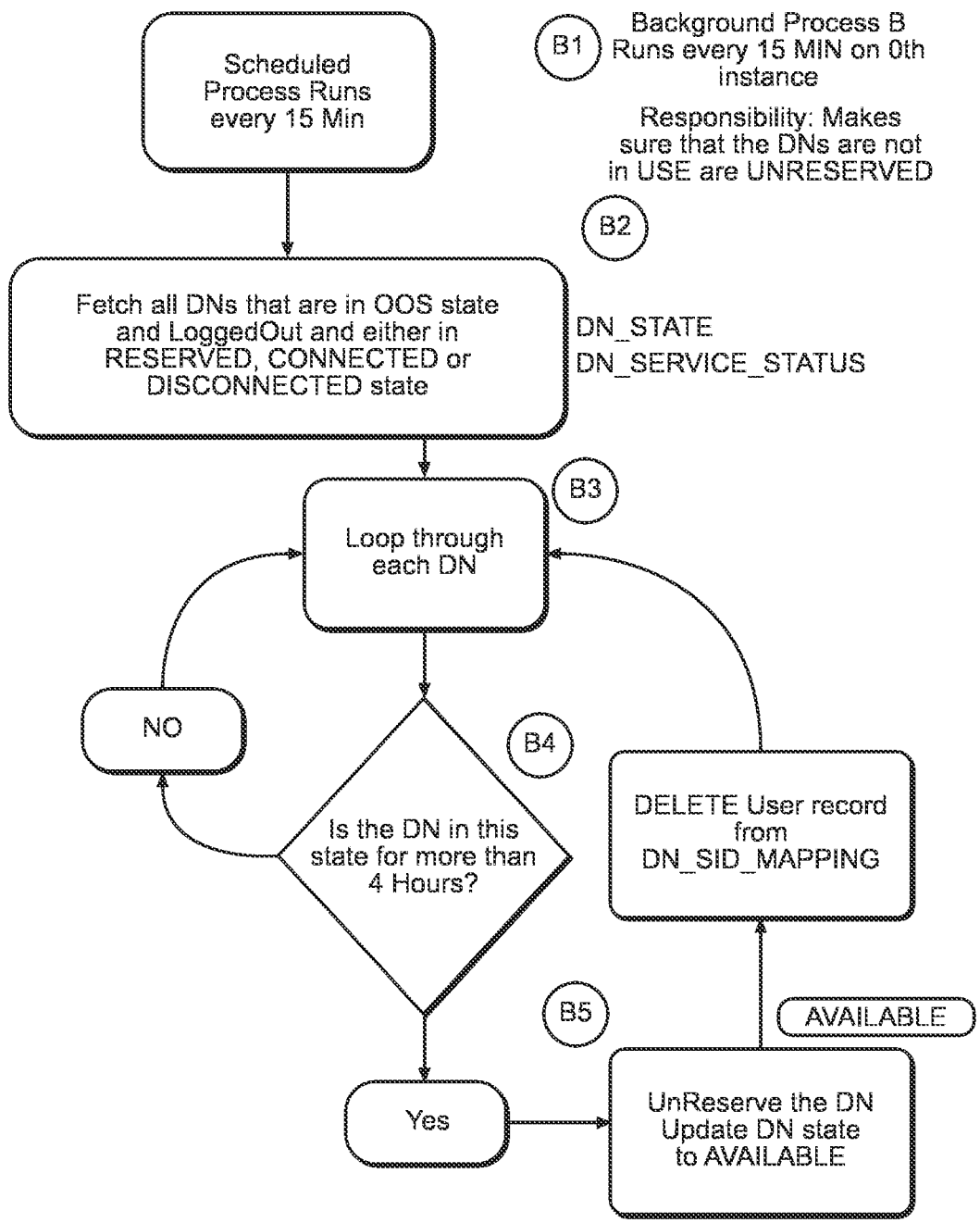
FIG. 8 is a flow diagram that illustrates an extension reclaim process in an operation of a system for dynamic management of directory number allocation in a manner that provides a smooth, efficient user experience and operational savings to the allocator, according to an exemplary embodiment.

FIG. 8 is a flow diagram 800 that illustrates an extension reclaim process in an operation of a system for dynamic management of directory number allocation in a manner that provides a smooth, efficient user experience and operational savings to the allocator, according to an exemplary embodiment.

As illustrated in flow diagram 800, the extension reclaim process is responsible to unreserve extensions that are in a NOT_IN_USE state for more than 4 hours. In an exemplary embodiment, the extension reclaim process runs every 15 minutes. A DN is considered NOT_IN_USE if it is OUT_OF_SERVICE and logged out of a user ribbon. Once a DN is unreserved, it is eligible to be assigned to a newly logged user/specialist. DNs in the FAILED state may also be reclaimed if the number of failed DNs is greater than 10% of the total number of AVAILABLE DNs. The extension reclaim process also cleans up orphaned DNs that are in the QUEUED state, i.e., DNs that have become queued by an instance that no longer exists, such as, for example, a forced shutdown. The extension reclaim process also audits the state table and logs statistics, such as, for example, a number of DNs by state and grouped by site code and switch identifier.

Accordingly, with this technology, an optimized process for dynamic management of directory number allocation in a manner that provides a smooth, efficient user experience and operational savings to the allocator is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for managing an allocation of extensions that correspond to directory numbers, the method being implemented by at least one processor, the method comprising:
   receiving, by the at least one processor from a first user via a telephone terminal, a connect request for an assignment of an extension that corresponds to a directory number that has a predetermined number of digits;
   analyzing, by the at least one processor, the connect request to determine at least one characteristic trait associated with the first user;
   determining, by the at least one processor, a set of available extensions that are assignable to the first user based on the at least one characteristic trait; and
   assigning, by the at least one processor to the first user, a first extension from within the set of available extensions that has not previously been assigned.

2. The method of claim 1, wherein the at least one characteristic trait includes at least one from among a switch associated with the first user, a data center associated with the first user, a deployment associated with the first user, and a physical location associated with the first user.

3. The method of claim 1, wherein the set of available extensions includes a predetermined range of numbers having a minimum, a maximum, and every integer between the minimum and the maximum.

4. The method of claim 1, further comprising prechecking to determine whether the first extension is valid and correctly configured before the assigning of the first extension to the first user.

5. The method of claim 1, wherein each extension includes a twelve-digit number within which a first subset of digits refers to a switch identifier that is associated with one from among a predetermined plurality of switches, a second subset of digits refers to a site code that is associated with a physical location, and a third subset of digits uniquely refers to the first user.

6. The method of claim 5, further comprising:
before the receiving of the connect request from the first user, allocating, to each switch included in the predetermined plurality of switches, a respective set of switch-specific extensions, such that a number of switch-specific extensions allocated to each switch included in the predetermined plurality of switches is equal.

7. The method of claim 1, further comprising:
after the assigning of the first extension to the first user, transmitting, to the first user, a message that notifies the first user of the assigned extension, the message including a prompt to click on a button to establish a connection between the first user and the first extension;
receiving, from the first user, an indication that the first user has clicked on the button; and
propagating the assigned extension to a ribbon associated with the first user in order to facilitate subsequent uses of the first extension by the first user without requiring reentry of the first extension by the first user.

8. The method of claim 1, wherein each extension included in the set of available extensions is associated with a Web Real-Time Communication (WebRTC) softphone application.

9. The method of claim 1, wherein the assigning of the first extension occurs within 100 milliseconds of the receiving of the connect request.

10. A computing apparatus for managing an allocation of extensions that correspond to directory numbers, the computing apparatus comprising:
a processor;
a memory; and
a communication interface coupled to each of the processor and the memory,
wherein the processor is configured to:
receive, from a first user via a telephone terminal and the communication interface, a connect request for an assignment of an extension that corresponds to a directory number that has a predetermined number of digits;
analyze the connect request to determine at least one characteristic trait associated with the first user;
determine a set of available extensions that are assignable to the first user based on the at least one characteristic trait; and
assign, to the first user, a first extension from within the set of available extensions that has not previously been assigned.

11. The computing apparatus of claim 10, wherein the at least one characteristic trait includes at least one from among a switch associated with the first user, a data center associated with the first user, a deployment associated with the first user, and a physical location associated with the first user.

12. The computing apparatus of claim 10, wherein the set of available extensions includes a predetermined range of numbers having a minimum, a maximum, and every integer between the minimum and the maximum.

13. The computing apparatus of claim 10, wherein the processor is further configured to precheck to determine whether the first extension is valid and correctly configured before the assignment of the first extension to the first user.

14. The computing apparatus of claim 10, wherein each extension includes a twelve-digit number within which a first subset of digits refers to a switch identifier that is associated with one from among a predetermined plurality of switches, a second subset of digits refers to a site code that is associated with a physical location, and a third subset of digits uniquely refers to the first user.

15. The computing apparatus of claim 14, wherein the processor is further configured to:
before the connect request is received from the first user, allocate, to each switch included in the predetermined plurality of switches, a respective set of switch-specific extensions, such that a number of switch-specific extensions allocated to each switch included in the predetermined plurality of switches is equal.

16. The computing apparatus of claim 10, wherein the processor is further configured to:
after the assignment of the first extension to the first user, transmit, to the first user via the communication interface, a message that notifies the first user of the assigned extension, the message including a prompt to click on a button to establish a connection between the first user and the first extension;
receive, from the first user via the communication interface, an indication that the first user has clicked on the button; and
propagate the assigned extension to a ribbon associated with the first user in order to facilitate subsequent uses of the first extension by the first user without requiring reentry of the first extension by the first user.

17. The computing apparatus of claim 10, wherein each extension included in the set of available extensions is associated with a Web Real-Time Communication (WebRTC) softphone application.

18. The computing apparatus of claim 10, wherein the assignment of the first extension occurs within 100 milliseconds of the reception of the connect request.

19. A non-transitory computer readable storage medium storing instructions for managing an allocation of extensions that correspond to directory numbers, the storage medium comprising executable code which, when executed by a processor, causes the processor to:
receive, from a first user via a telephone terminal, a connect request for an assignment of an extension that corresponds to a directory number that has a predetermined number of digits;
analyze the connect request to determine at least one characteristic trait associated with the first user;
determine a set of available extensions that are assignable to the first user based on the at least one characteristic trait; and
assign, to the first user, a first extension from within the set of available extensions that has not previously been assigned.

20. The storage medium of claim 19, wherein the at least one characteristic trait includes at least one from among a switch associated with the first user, a data center associated with the first user, a deployment associated with the first user, and a physical location associated with the first user.

* * * * *